Patented June 3, 1947

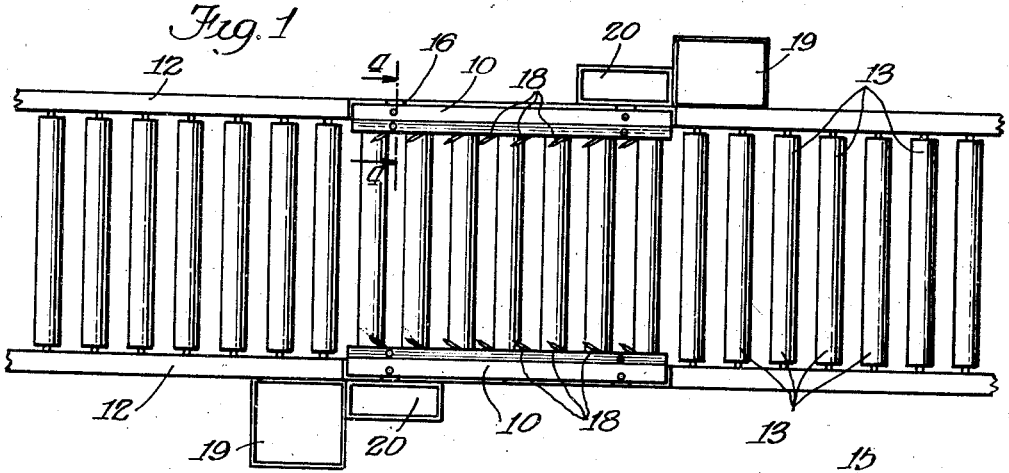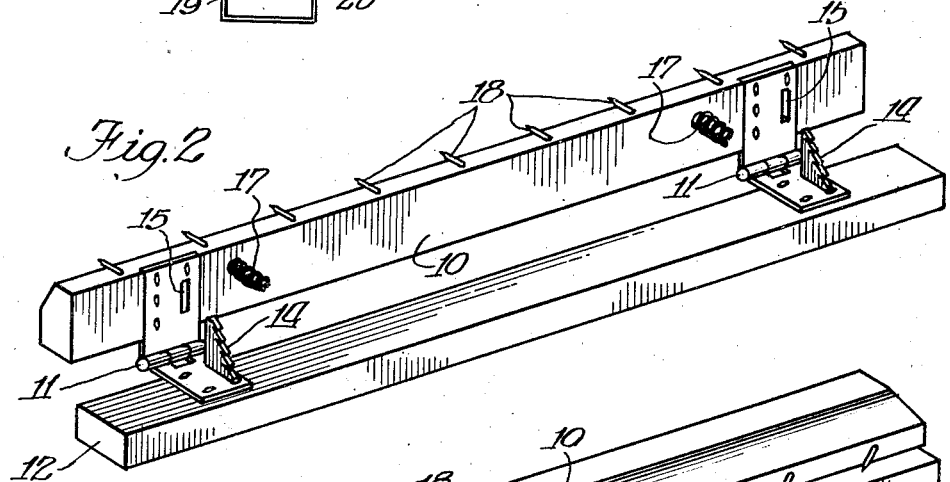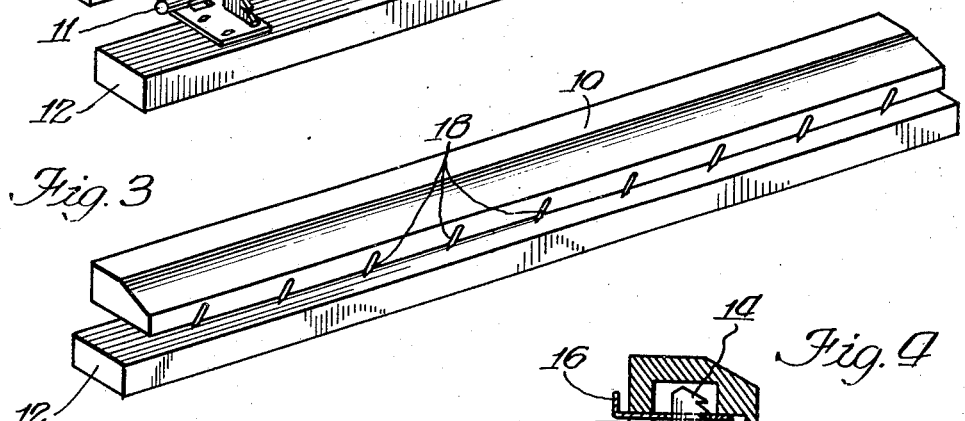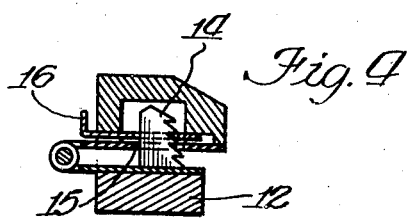

2,421,547

UNITED STATES PATENT OFFICE 2,421,547

BUTCHERING APPARATUS

Estel Derice Davidson, St. Louis County, Mo.

Application September 18, 1944, Serial No. 554,639

1 Claim. (Cl. 17—24)

The invention relates to improvements in butchering apparatus and more especially to an attachment for butchering conveyors adapted and arranged to hold a part of an animal body temporarily for further cutting, which is of simple construction and highly efficient in use.

Other objects will appear hereinafter.

The invention consists of the combinations and arrangements of parts hereinafter described and claimed.

The invention will be best understood by reference to the accompanying drawings forming a part of this specification and in which—

Fig. 1 is a partial top plan view of an ordinary roller conveyor equipped with two attachments embodying the invention;

Fig. 2 a perspective view of one of the attachments swung upwardly to exhibit the normally covered parts;

Fig. 3 a perspective view of the holding attachment shown in position of use; and Fig. 4 an enlarged transverse section taken substantially on line 4—4 of Fig. 1.

The embodiment of the invention illustrated in Fig. 1 comprises two holding bars 10 mounted upon hinges 11 at opposite sides of an ordinary butchering conveyor 12 provided with the usual supporting rollers 13, and upon which parts of animal carcasses may be readily pushed along in the course of butchering operations. Each of the hinges 11 is equipped with a notched detent 14 operating through a slot 15 in the other hinging part and cooperating with a slotted slide 16 to lock the corresponding holding bar 10 in various positions of adjustment. Compression springs 17 are mounted as indicated on the under side of each holding bar and serve to normally press the same upwardly to facilitate such adjustments as will be readily understood. Forwardly inclined impaling pins 18 are mounted as indicated on the inner sides of each of the holding bars 10 and upon which parts of an animal carcass may be readily impaled and held during further cutting operations. The usual chutes 19 and hot water boxes 20 are provided to facilitate the butchering operations, as will be readily understood.

By this arrangement, adjustable holding members are provided at opposite sides of the conveyor, upon which carcass parts such as hog bellies may be readily impaled and held for de-ribbing purposes with the usual knife. In this way, the de-ribbing and other cutting operations may be readily performed without removing the carcass part from the conveyor and the carcass part readily pushed along the conveyor after this operation, due to the forward inclination of the impaling pins. The usual chutes 19 are provided for deposit of the removed ribs and the hot water boxes 20 serve the usual purpose for cleaning the de-ribbing knives. The specific form and arrangement of parts is a simple and effective one for the purpose.

While I have illustrated and described the preferred form of construction for carrying the invention into effect, this is capable of variation and modification without departing from the spirit of the invention. I therefore do not wish to be limited to the precise details of the construction disclosed, but desire to avail myself of such variations and modifications as fall within the scope of the appended claim.

I claim:

Butchering apparatus comprising a conveyor; a holding bar pivotally mounted at one side of said conveyor; springs arranged to force said holding bar to swing upwardly and outwardly relative to said conveyor; a releasable latch arranged to lock said holding bar in various positions of adjustment; and forwardly inclined impaling pins on the inner edge of said bar adapted and arranged to hold temporarily for further cutting a part of an animal body resting on the conveyor.

ESTEL DERICE DAVIDSON.

REFERENCES CITED

The following references are of record in the file of this patent:

UNITED STATES PATENTS

| Number | Name | Date |
|---|---|---|
| 1,557,765 | Nicholas | Oct. 20, 1925 |
| 2,200,757 | Miller | May 14, 1940 |
| 2,306,101 | Van Zandt | Dec. 22, 1942 |
| 1,574,949 | Vogt | Mar. 2, 1926 |

FOREIGN PATENTS

| Number | Country | Date |
|---|---|---|
| 340,439 | Great Britain | Jan. 1, 1931 |